(12) United States Patent
Schweid

(10) Patent No.: US 6,734,991 B1
(45) Date of Patent: May 11, 2004

(54) METHOD AND APPARATUS FOR DETERMINING HALFTONE LINE FREQUENCY ESTIMATES USING MIN/MAX DETECTION

(75) Inventor: Stuart A. Schweid, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/405,928

(22) Filed: Sep. 24, 1999

(51) Int. Cl.[7] ............................................... H04N 1/405
(52) U.S. Cl. ...................................... 358/3.06; 358/448
(58) Field of Search ................. 358/1.9, 1.8, 3.07–3.12, 358/3.14, 3.13, 3.2–3.22, 448; 382/237

(56) References Cited

U.S. PATENT DOCUMENTS

| | | | | |
|---|---|---|---|---|
| 5,200,821 A | * | 4/1993 | Haghiri et al. | 348/427.1 |
| 5,293,430 A | | 3/1994 | Shiau et al. | 382/42 |
| 5,621,519 A | * | 4/1997 | Frost et al. | 356/124.5 |
| 5,822,470 A | * | 10/1998 | Vehvilainen | 382/270 |

* cited by examiner

Primary Examiner—Thomas D. Lee
Assistant Examiner—Stephen Brinich
(74) Attorney, Agent, or Firm—Fay, Sharpe, Fagan, Minnich & McKee, LLP

(57) ABSTRACT

A method and apparatus is provided for determining a halftone line screen frequency estimate f at a pixel of interest in an image formed of a plurality of pixels arranged in a regular array of rows and columns. A first single dimensional line screen frequency estimate $f_H$ is determined based on video values of a first set of pixels in a row of pixels in the scanned image. Next, a second single dimensional line screen frequency estimate $f_V$ is determined based on video values of a second set of pixels in a column of pixels in the scanned image. A two-dimensional halftone line screen frequency estimate f is calculated at each pixel of interest based on a norm of the first single dimensional line screen frequency estimate $f_H$ and on the second single dimensional line screen frequency estimate $f_V$. A halftone line screen angle estimate a is calculated at each pixel of interest based on an arctangent of the ratio between the first and second single dimensional line screen frequency estimates. Maxima and minima (MIN/MAX) extrema peak detection is used in fastscan and slowscan directions to determine the first and second single dimensional frequency estimates. False peak detection is prevented in the MIN/MAX detection scheme.

20 Claims, 5 Drawing Sheets

METHOD AND APPARATUS FOR DETERMINING HALFTONE LINE FREQUENCY ESTIMATES USING MIN/MAX DETECTION

BSCKGROUND OF THE INVENTION

The present invention is directed to the art of digital image processing and, more particularly, to a method and apparatus for determining a halftone line screen frequency estimate and a halftone line screen angle estimate at each pixel of an image scan formed of a plurality of pixels arranged in a regular array of fastscan pixel rows and slowscan pixel columns and will be described with particular reference thereto. However, it is to be understood that the present invention has broader application in many fields such as in calculating halftone line and screen frequency and angle estimates of a wide variety of digital images and other digital information or data.

Segmentation plays an important role in electronic image processing. In systems that rely on image segmentation, the detection of halftones in compound documents is very useful for image storage and processing. The accuracy of most halftone detection algorithms rests primarily on the ability of the system to determine an accurate estimate of halftone frequency. Accordingly, the art of estimating halftone frequencies has developed over the years.

Many halftone frequency estimate algorithms are available for detecting the halftone frequency of dot screens. One such algorithm commonly known as two dimensional peak detection finds isolated peak video values in a scanned image. The isolated peaks are detected as minimums and maximums (MIN/MAX) using a local criteria or other scheme. Essentially, in two-dimensional peak detection, the isolated peak count in a local area provides a measure of the halftone frequency for dot screen halftones.

Two-dimensional peak detection cannot be used, however, to determine the halftone frequency of line screens. Since line screens do not have isolated peaks as such, but rather, are formed of pulse-width modulated lines, two-dimensional peaks cannot be directly detected.

As a solution to the deficiencies of the above-described peak detection scheme, the auto-correlation function has been developed. In auto-correlation, a copy of the scanned image pattern is shifted along a first direction and compared with the unshifted scanned image itself acting as a "template" until a good match or correspondence is found. The shift distance along the first direction required to establish good correspondence between the unshifted image (template) and shifted image copy gives an indication of halftone line screen frequency in the first shift direction. Mathematically, the basic line frequency is determined by finding maxima of an inner product calculation taken between the unshifted image used as a template and the shifted image shifted in the first direction.

The use of the auto-correlation function to provide a line frequency estimate is somewhat expensive and difficult to implement. In addition, the auto-correlation function becomes very burdensome when the halftone pattern in the original document is either scanned at an angle or occurs naturally at an angle relative to the regular array of sensor rows and columns. The processing for determining the basic line frequency becomes much more difficult when the line frequency pattern in the scanned image is offset at an angle. In that case, the basic line frequency is determined using inner product calculations taken between the image and the image shifted in a first direction and also between the image and the image shifted in a second direction. The shifts in the first and second directions are necessary to provide a frequency estimate of halftone lines that occur at an angle relative to the array of pixel rows and columns in the scanned image. Accordingly, the processing required by the auto-correlation function is time consuming and expensive.

Further to the above, when the basic line frequency is not an integer multiple of the scan sampling frequency, an additional algorithm or layer of processing becomes necessary to detect the maxima of the inner product calculation taken between the image (template) and the one or more shifted image copies. Essentially, the additional layer of processing must be able to detect "flat" peak areas in the interference pattern between the shifted and the unshifted image as peaks in the original image.

Accordingly, it would be desirable to provide a relatively simple method and apparatus for determining frequency estimates of halftone line patterns that overcomes the problems and processing complexities that are present in the prior art schemes.

It would further be desirable to extend some basic concepts used in the scheme for determining halftone dot frequency estimates for novel use in determining halftone line frequency estimates.

It would still further be desirable to extend portions of the basic scheme used to determine halftone dot frequency estimates for use in a novel way for determining an estimate of an angle of halftone lines in a scanned image.

The present invention contemplates a new and improved method and apparatus for determining halftone line frequency estimates using MIN/MAX detection which overcomes the above-referenced problems and others.

SUMMARY OF THE INVENTION

In accordance with one aspect of the present invention, one-dimensional peak detection algorithms are used in first and second directions of interest to locate local maximas (MAXs) and local minimas (MINs). For each pixel in the scanned image, an overall line screen frequency estimate is determined from the sum of the squares of the line frequencies taken in the first and second directions.

In accordance with a more limited aspect of the present invention, for each pixel in the scanned image an overall line screen angle estimate is determined from the arctangent of the ratio of a first direction frequency estimate to a second direction frequency estimate.

In accordance with a still more limited aspect of the invention, one-dimensional peak detection algorithms are used in vertical and horizontal scanned image directions to locate the local maximas (MAXs) and the local minimas (MINs). The overall line screen frequency estimate for each scanned image pixel is determined from the sum of the squares of the line frequencies taken in the vertical and horizontal scanned image directions. The overall line screen angle estimate is determined at each scanned image pixel from the arctangent of the ratio between the vertical and horizontal scanned image direction frequencies.

In accordance with yet a still more limited aspect of the invention, one-dimensional peak detection algorithms are used in the fastscan and slowscan directions to locate local maximas and local minimas. The overall line screen frequency estimate is determined at each scanned image pixel from the sum of the squares of the line frequencies of the fastscan and slowscan directions. The overall line screen frequency angle estimate is determined at each scanned image pixel from the arctangent of the ratio between the fastscan and slowscan direction frequency estimates.

One advantage of the present invention is that halftone line frequency estimates are determined using relatively simple and inexpensive one-dimensional MIN/MAX peak detection algorithms. This reduces the cost of estimate processing overhead and enables a simple implementation.

Another advantage of the present invention is that the halftone line frequency angle estimates are determined using the same relatively simple and inexpensive one-dimensional MIN/MAX peak detection algorithms that are used to provide the halftone line frequency estimates. Again, the processing overhead costs are reduced and simple implementation is enabled.

Still further advantages and benefits of the present invention will become apparent to those of ordinary skill in the art upon reading and understanding the following detailed description of the preferred embodiments.

BRIEF DESCRIPTIONS OF THE DRAWINGS

The invention may take form in various components and arrangements of components, and in various steps and arrangements of steps. The drawings are only for purposes of illustrating preferred embodiments and are not to be construed as limiting the invention.

Figure 3A:
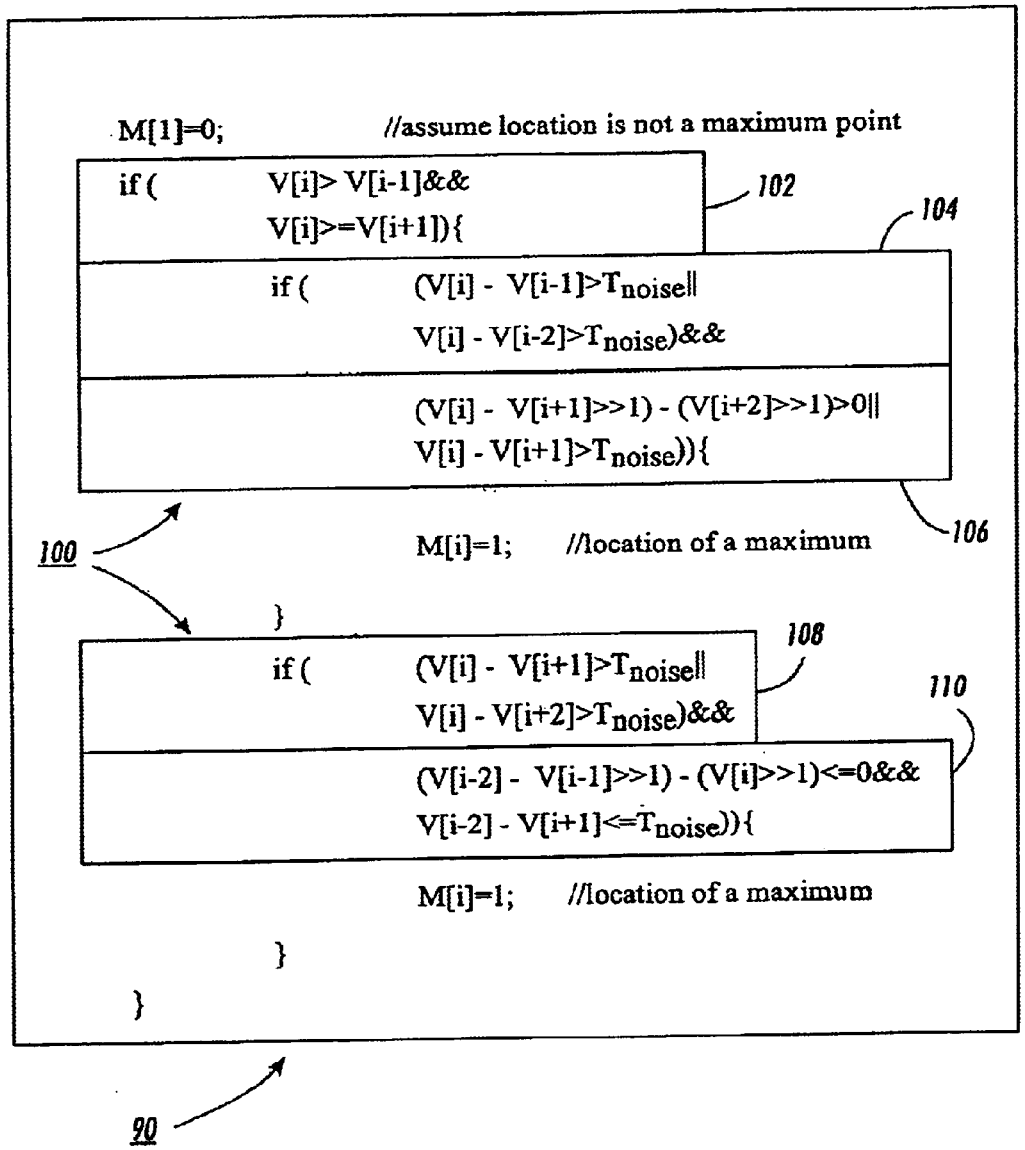
Figure 3B:
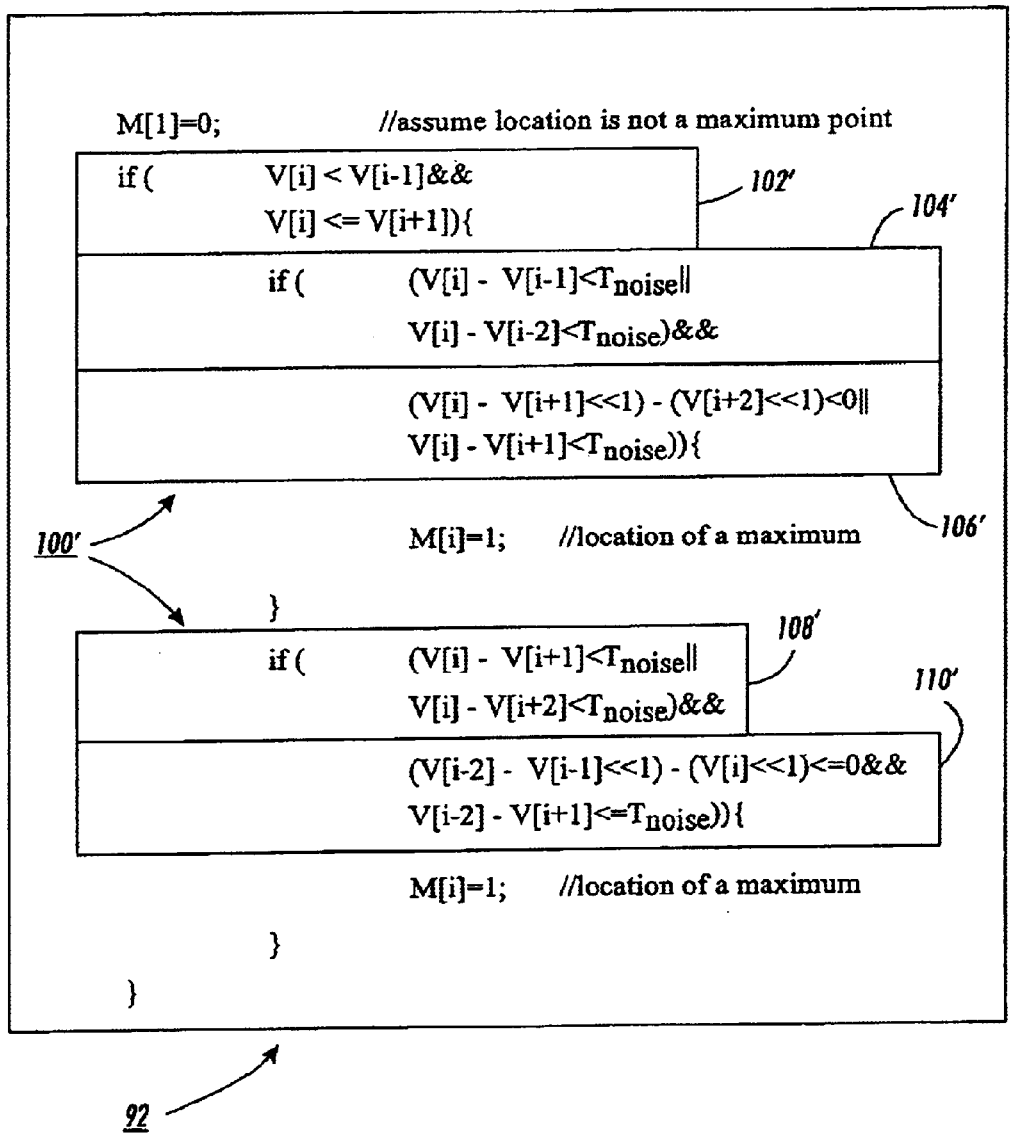
Figure 4A:
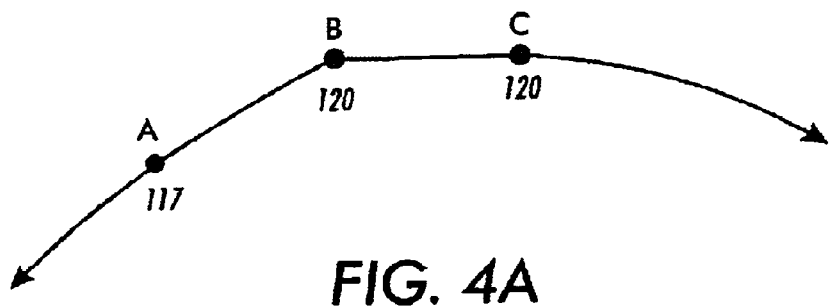
Figure 4B:
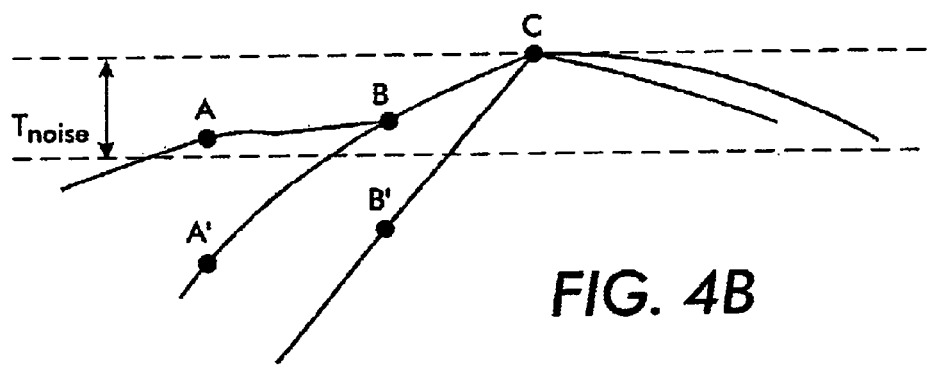
Figure 4C:
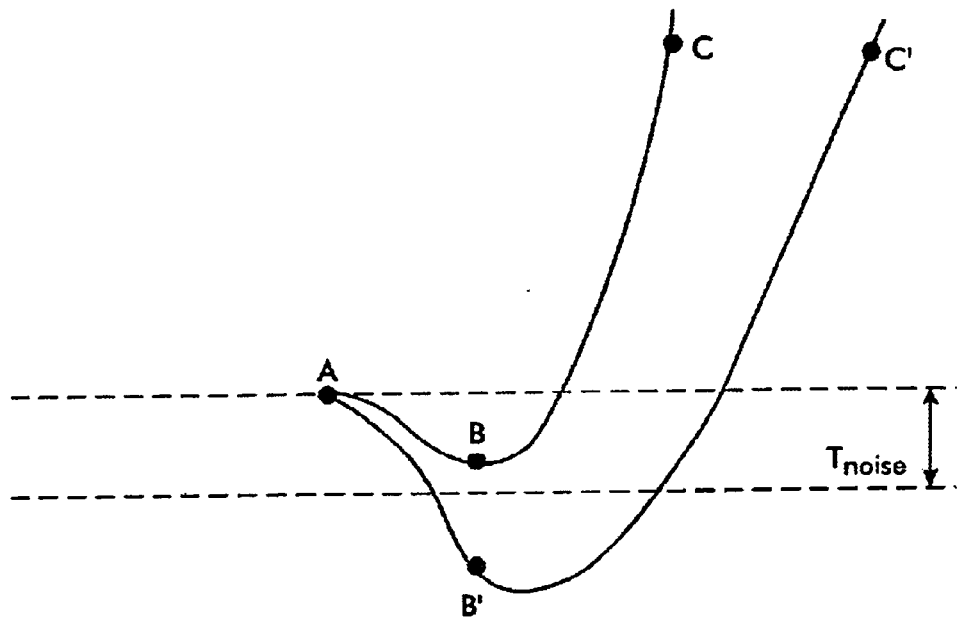

FIG. 3a illustrates a preferred method shown in pseudo code of locating peaks in a scanned image using MAX peak detection; and, FIG. 3b illustrates a preferred method shown in pseudo code of locating peaks in a scanned image using MIN peak detection; and, FIGS. 4a–4c show portions of video curves illustrating false peak failure mode prevention algorithms used by the MAX/MIN peak detection methods of FIGS. 3a and 3b in accordance with the present invention.

DETAILED DESCRIPTION OF THE PREFERRED EMBODIMENTS

Figure 1:
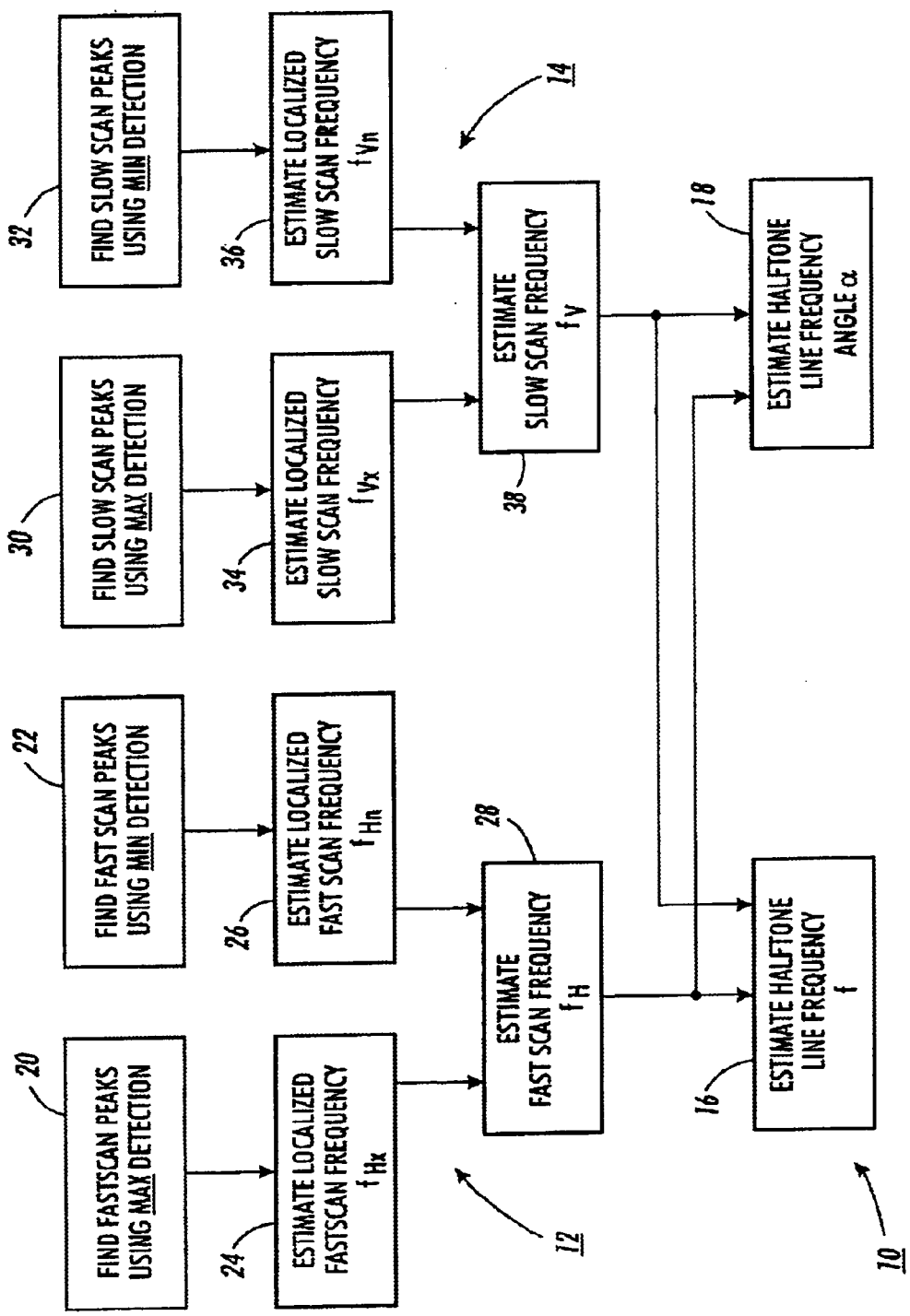
FIG. 1 is a flowchart illustrating a preferred method for determining halftone line frequency estimates according to the present invention.

With reference to FIG. 1, a preferred method for determining a halftone line frequency estimate at a pixel of interest in a scanned image is shown. The method 10 is advantageous for determining halftone line frequency estimates f at each pixel of interest in an image formed of a plurality of pixels arranged in a regular array of rows and columns. As shown in the figure, the method 10 generally includes a first set of steps 12 for determining an estimated first single dimensional frequency estimate $f_H$ based on video values of a first set of pixels in a row of pixels of the scanned image including the pixel of interest. In addition, the method 10 includes a second set of steps 14 for estimating a second single dimensional frequency estimate $f_V$ based on video values of a second set of pixels in a column of pixels of the scanned image including the pixel of interest. In step 16, a halftone line frequency estimate f is calculated at each pixel of interest based on a norm of the estimated first single dimensional frequency estimated $f_H$ and on the estimated second single dimensional frequency estimated $f_V$. At step 18, the halftone line frequency angle estimate α is calculated based on the estimated first single dimensional frequency estimate $f_H$ and on the estimated second single dimensional frequency estimate $f_V$.

Essentially, the preferred method for determining halftone line frequency estimates according to the present invention operates on video values of scanned pixels arranged in a regular array of repeating rows and columns. For the purposes of discussion and description of the preferred embodiments, the rows of scanned image pixels will be referred to as "fastscan" pixels and are normally associated with the horizontal aspect of scanned image pages. Similarly, the repeating columns of scanned image pixels will be referred to as "slowscan" image pixels and are normally associated with the vertical direction on the scanned image page.

In accordance with the present invention, therefore, and with continued reference to FIG. 1, the first set of steps 12 for estimating the fastscan frequency $f_H$ include processing for finding fastscan pixel peaks using MIN/MAX detection. In that regard, fastscan pixel peaks are detected using MAX peak detection at step 20. Similarly, fastscan pixel peaks are detected at step 22, using MIN peak detection. The preferred algorithm for finding fastscan pixel peaks using MAX peak detection will be described in greater detail below with reference to FIG. 3a. Further, the preferred algorithm for finding fastscan pixel peaks using MIN detection will be described below with reference to FIG. 3b.

After the fastscan pixel peaks are identified using MAX peak detection at step 20, a localized fastscan frequency estimate $f_{HX}$ is obtained at step 24. In accordance with the present invention, the number of MAX peaks in a given neighborhood adjacent a pixel of interest is used to estimate the localized frequency. The neighborhood is preferably defined as a rectangular box centered about the pixel of interest. However, pyramidal or other suitably shaped boundary areas can be used as well. For the purposes of describing the preferred embodiment of the invention and not for limiting same, the length of the rectangular box is assumed to be $L_H$ in horizontal (fastscan) pixels and the height of the box is assumed to be the $L_V$ in vertical (slowscan) pixels. Where the horizontal resolution of the image scanner is $R_H$ horizontal spots per inch and the vertical resolution is $R_V$ vertical spots per inch, then the horizontal line screen frequency estimate using MAX peak detection (FIG. 3a) is preferably calculated according to:

$$f_{HX} = \text{\# of horizontal max peaks in box} * R_H/(L_H * L_V).$$

At step 26, the localized fastscan frequency $f_{HN}$ is estimated using the fastscan peaks uncovered with MIN detection (FIG. 3b) from step 22. The number of horizontal MIN peaks in a box from step 22 is used together with a fictitious rectangular box centered about a pixel of interest having length $L_H$ and width $L_V$ to calculate the estimated localized fastscan frequency $f_{HN}$ according to:

$$f_{VX} = \text{\# of vertical max peaks in box} * R_V/(L_H * L_V).$$

With continued reference to FIG. 1, the second set of steps 14 of estimating a second single-dimensional frequency estimate $f_V$ include processing for finding slowscan pixel peaks using MIN/MAX detection. In that regard, slowscan pixel peaks are detected using MAX peak detection at step 30. Similarly, slowscan pixel peaks are detected at step 32 using MIN peak detection. The preferred algorithm for finding slowscan pixel peaks using MAX peak detection will be described in greater detail below with reference to FIG. 3a. Further, the preferred algorithm for finding slowscan pixel peaks using MIN peak detection will be described below with reference to FIG. 3b.

After the slowscan pixel peaks are identified using MAX peak detection at step 30, a localized slowscan frequency estimate $f_{VX}$ is obtained at step 34. In accordance with the present invention, the number of MAX peaks in a given neighborhood about a pixel of interest is used to estimate the localized frequency. As described above, the neighborhood is preferably defined as a rectangular box centered about the pixel of interest, however, pyramidal or other suitably shaped boundary areas can be used as well. For the purposes of describing the preferred embodiment of the invention, the length of the rectangular box is assumed to be $L_H$ in horizontal (fastscan) pixels and the height of the box is assumed to be the $L_V$ in vertical (slowscan) pixels. Where the horizontal resolution of the image scanner is $R_H$ horizontal spots per inch and the vertical resolution is $R_V$ vertical spots per inch, then the vertical frequency estimate using MAX peak detection (FIG. 3a) is preferably calculated according to:

$$f_{VX} = \text{\# of vertical max peaks in box} * R_V / (L_H * L_V).$$

At step 36, the localized slowscan frequency $f_{VN}$ is similarly estimated using the slowscan peak uncovered with MIN detection (FIG. 3b) from step 32. The number of vertical MIN peaks in a box from step 32 is used together with a fictitious rectangular box centered about a pixel of interest having length $L_H$ and width $L_V$ to calculate the estimated localized slowscan frequency $f_{VN}$ according to:

$$f_{VN} = \text{\# of vertical min peaks in box} * R_V / (L_H * L_V).$$

Having thus obtained estimates of the localized fastscan frequency using MAX detection $f_{HX}$ and MIN detection $f_{HN}$ in the first set of steps 12, the fastscan (horizontal) frequency estimate is determined in step 28 based upon a one of an average value or the maximum between the two independent frequencies $f_{HX}$ and $f_{HN}$ according to:

if ABSOLUTE_VALUE $(f_{HX}-f_{HN}) < R_H/L_H$
        then $f_H = (f_{HX} + f_{HN})/2$
        else $f_H = \max(f_{HX}, f_{HN})$
    end if Similarly, having thus obtained estimates of the localized slowscan frequency using MAX detection $f_{VX}$ and MIN detection $f_{VN}$ in the second set of steps 14, the slowscan (vertical) frequency estimate is determined in step 38 based upon a one of an average value or the maximum between the two independent frequencies $f_{VX}$ and $f_{VN}$ according to:

if ABSOLUTE_VALUE $(f_{VX}-f_{VN}) < R_V/L_V$
        then $f_V = (f_{VX} + f_{VN})/2$
        else $f_V = \max(f_{VX}, f_{VN})$
    end if Having obtained the fastscan (horizontal) frequency estimate $f_H$ in step 28 and the slowscan (vertical) frequency estimate $f_V$ in step 38 at the pixel of interest as described above, the halftone line screen frequency estimate f is estimated at step 16 according to:

$$f = \sqrt{(f_H^2 + f_V^2)}.$$

Similarly, having obtained the fastscan frequency estimate $f_H$ in step 28 and the slowscan frequency estimate $f_V$ in step 38 as described above, the halftone line frequency angle estimate a is determined at step 18 according to:

$$\alpha = \arctan(f_V/f_H).$$

Figure 2:
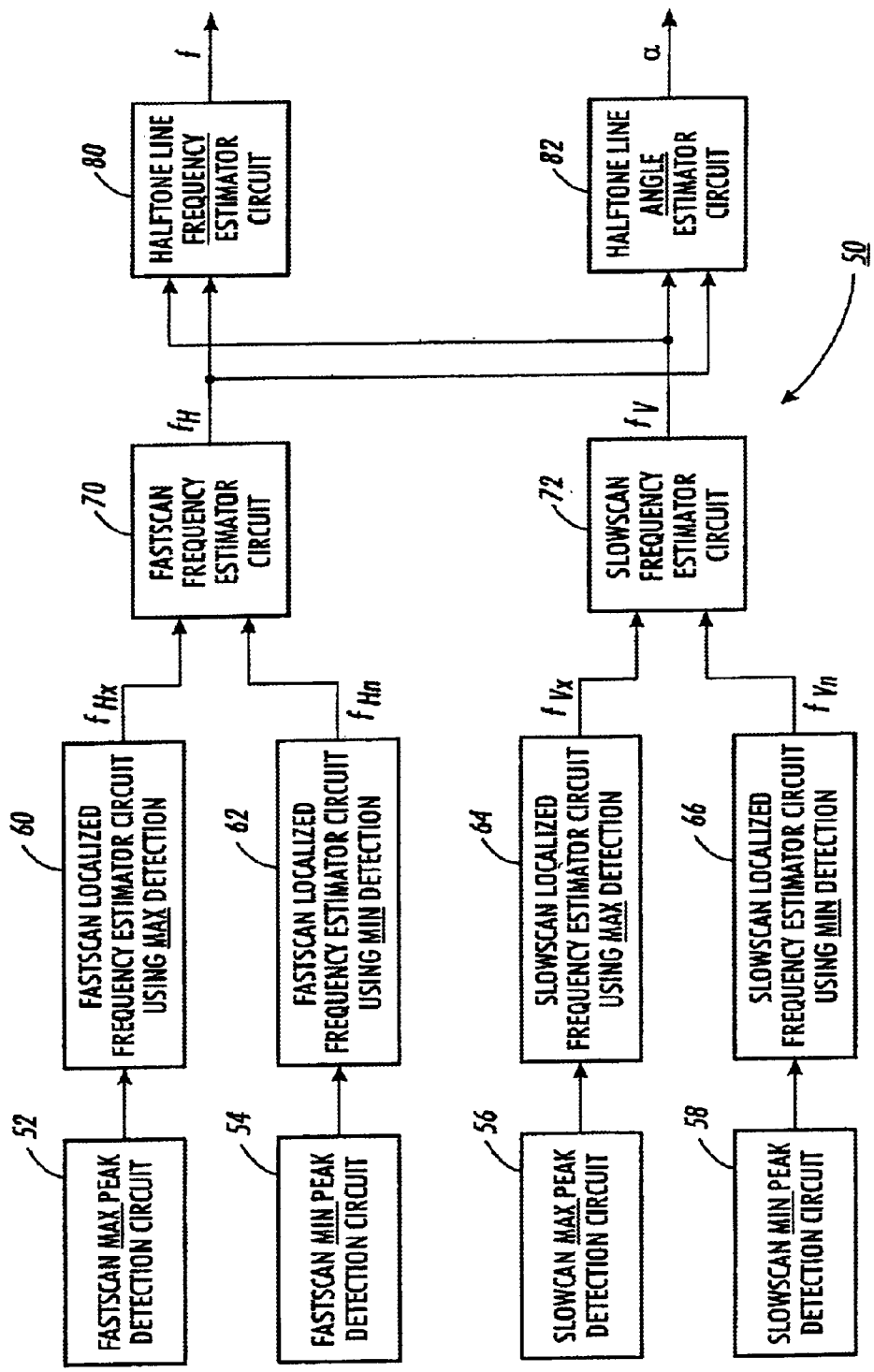
FIG. 2 is a schematic illustration of a preferred apparatus for determining halftone line frequency estimates in accordance with the present invention.

Turning now to FIG. 2, an apparatus 50 for determining halftone line frequency estimates using MIN/MAX detection in accordance with the present invention is shown. Essentially, the circuit 50 includes a fastscan MAX peak detection circuit 52, a fastscan MIN peak detection circuit 54, a slowscan MAX peak detection circuit 56, and a slowscan MIN peak detection circuit 58. Preferably, the fastscan and slowscan MAX peak detection circuits 52, 56 respectively find local maxima in the fastscan (horizontal) and the slowscan (vertical) directions in the scanned image on a per pixel basis according to the algorithm shown in FIG. 3a and described in greater detail below. Similarly, in accordance with the preferred embodiment of the invention, the fastscan and slowscan MIN peak detection circuits 54, 58 respectively find local minima in the fastscan (horizontal) and slowscan (vertical) scanned image pixel directions according to the algorithm shown in FIG. 3b.

With yet continued reference to FIG. 2, the fastscan MAX peak pixel information and the fastscan MIN peak pixel information developed in the MAX peak detection circuit 52 and the MIN peak detection circuit 54, respectively, are delivered to a fastscan MAX detection localized frequency estimator circuit 60 and to a fastscan MIN detection localized frequency estimator circuit 62. The fastscan MAX detection localized frequency estimator circuit 60 develops a fastscan localized frequency estimate $f_{HX}$ according to:

$$f_{HX} = \text{\# of horizontal MAX peaks in box} * R_H / (L_H * L_V).$$

The fastscan localized frequency estimator circuit using MIN detection 62 develops a fastscan localized frequency estimate $f_{HN}$ according to:

$$f_{Hn} = \text{\# of horizontal MIN peaks in box} * R_H / (L_H * L_V).$$

Similarly, a slowscan MAX detection localized frequency estimator circuit 64 generates a slowscan localized frequency estimate $f_{VX}$ according to:

$$f_{VX} = \text{\# of vertical MAX peaks in box} * R_V / (L_H * L_V).$$

Lastly, a slowscan localized frequency estimator circuit 66 generates a slowscan localized frequency estimate $f_{VN}$ according to:

$$f_{Vn} = \text{\# of vertical MIN peaks in box} * R_V / (L_H * L_V).$$

A fastscan frequency estimator circuit 70 receives the estimated fastscan frequencies using MAX detection $f_{HX}$ and using MIN detection $f_{HN}$ to generate a fastscan frequency estimate $f_H$ according to:

if ABSOLUTE_VALUE $(f_{HX}-f_{HN}) < R_H/L_H$
        then $f_H = (f_{HX} + f_{HN})/2$
        else $f_{H=\max(fHX}, f_{HN})$
    end if Similarly, a slowscan frequency estimator circuit 72 receives the slowscan MAX detection localized frequency estimate $f_{VX}$ and the slowscan MIN detection localized frequency estimate $f_{VN}$ to determine the slowscan frequency estimate $f_V$ according to:

if ABSOLUTE_VALUE $(f_{VX}-f_{VN}) < R_V/L_V$
        then $f_V = (f_{VX} + f_{VN})/2$
        else $f_V = \max(f_{VX}, f_{VN})$
    end if A halftone line frequency estimator circuit 80 generates the desired halftone line frequency estimated f according to:

$$f = \sqrt{(f_H^2 + f_V^2)}.$$

Lastly, a halftone line angle estimator circuit 82 develops an estimate of the line frequency angle a according to:

$$\alpha = \arctan(f_V/f_H).$$

The preferred algorithm for locating fastscan and slowscan maxima extrema pixels 90 is shown in FIG. 3a. The preferred algorithm for locating fastscan and slowscan minima extrema pixels 92 is shown in FIG. 3b. Preferably, the procedures for finding the maxima and minima extrema are symmetrical. More particularly, the inequality tests are merely reversed between MAX detection 90 (FIG. 3a) and MIN detection 92 (FIG. 3b). Accordingly, it is to be understood that the description of the MAX peak detection is equally applicable to MIN peak detection using principles of simple symmetry.

Turning now to FIG. 3a, the maxima extrema test 100 executed by the fastscan and slowscan MAX peak detection circuits 20 and 30 includes a threshold test portion 102 that must be satisfied before a pixel can be declared a maximum peak. In that regard, the threshold test portion 102 ensures that a video value at a given pixel V[i] is greater than or equal to the immediately preceding pixel neighbor V[i+1] and also greater than the immediately succeeding pixel neighbor V[i−1]. In the fastscan (horizontal) direction, the immediately preceding pixel is to the right of the pixel of interest V[i] by convention and the immediately succeeding pixel is to the left of the pixel of interest V[i]. Similarly, in the slowscan (vertical) direction, the immediately preceding pixel is below the pixel of interest V[i] and the immediately succeeding pixel is above the pixel of interest V[i].

Essentially, the threshold test portion 102 allows "flat" peaks such as shown in FIG. 4a to be detected and also to prevent two separate peaks from being detected where the peak is flat. As shown in FIG. 4a, the value of pixel B is greater than the value of the pixel A. Pixel B is also greater than or equal to the value of the pixel C. Accordingly, pixel B would pass the threshold test portion 102 as a peak candidate. Pixel C, however, would fail the threshold test portion 102 because the value of the pixel C is not greater than the value of the immediately succeeding pixel B. This prevents the improper detection of two separate peaks for "flat" video curve portions such as shown in FIG. 4a.

With continued reference to FIG. 3a, the maxima extrema test 100 further includes a noise margin test portion 104 to ensure that false peaks are not detected due to noise surrounding the pixel of interest V[i]. The noise margin test portion 104 includes a test to determine whether the difference between the video value of the pixel of interest V[i] and the immediately succeeding pixel V[i−1] is greater than a predetermined noise threshold value $T_{noise}$. As shown in FIG. 4b, if the difference between the video value of the pixel of interest C and the immediately succeeding pixel B is less than the noise threshold value $T_{noise}$ then the pixel C may not be a true maxima extrema but rather, could have a video value influenced by noise. However, if the immediately succeeding pixel is B', where the difference in video values is greater than the noise margin $T_{noise}$, then the pixel of interest C can be assumed to be a local maxima extrema.

In the case where the immediately succeeding pixel is B but the next succeeding pixel is A' having a video value less than the pixel of interest C by an amount greater than the noise threshold value, the pixel of interest C can be assumed to be a local maxima. Where both the first succeeding pixel B and the second succeeding pixel A have video value differences with respect to the pixel of interest C that is less than the noise threshold value, then the pixel of interest C is not identified as a local maxima extrema but, rather, is assumed to be an aberration caused by noise. Overall, the noise margin test portion 104 ensures that the video value of each successive pixel is rising quickly towards the pixel of interest e.g. A', B', C or A', B, C rather than slowly e.g. A, B, C.

With still yet further reference to FIG. 3a, the maxima extrema test 100 includes a shallow peak test portion 106 to ensure that the pixel of interest is a true local maxima extrema rather than merely a step on a path towards a true peak several pixels ahead. In that regard, the shallow peak test portion 106 calculates the average pixel value for the two pixel succeeding the pixel of interest A and then compares the average value obtained with the video value of the pixel of interest A. When the video value difference is less than 0, the pixel of interest A is assumed to not be a true local extrema. As shown in FIG. 4c, this would occur in the video value sequence A, B, C. In that case, it is clear that the pixel A is merely a step towards a local extrema near the pixel C.

On the other hand, the shallow peak test portion 106 provides for the identification of the pixel of interest as a local extrema when the next preceding pixel, such as B', has a video value far below that of the pixel of interest A. More particularly, shallow peak test portion 106 labels the pixel of interest A as a local maxima when the difference between the pixel of interest and the next preceding pixel B' is greater than a predetermined threshold value $T_{noise}$.

The maxima extrema test 100 includes a "forward looking" noise margin test portion 108 and a forward shallow peak test portion 110 as shown. Essentially the criteria used by the noise margin test 104 described above are used in the forward noise margin 108 test as well, but are based on next preceding pixels i.e. V[i+1] and V[i+2] rather than the succeeding pixels i.e. V[i−1] and V[i−2]. Similarly, the criteria used by the shallow peak test 106 described above are used by the forward shallow peak test portion 108 as well but are based on the next succeeding pixels i.e. V[i−1] and V[i−2] rather than the preceding pixels i.e. V[i+1] and V[i+2]. In that regard, in the preferred embodiment, the portions of the maxima extrema test 100 are symmetrically centered on the pixel of interest V[i].

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or then equivalents thereof

Having thus described the preferred embodiments, the invention is now claimed to be:

1. A method of determining a halftone line frequency estimate f at each pixel V(i) of an image formed of a plurality of pixels arranged in a plurality of fastscan pixel rows and slowscan pixel columns, the method comprising the steps of:

for each fastscan pixel row of said image:
identifying a set of fastscan maxima extrema pixels having a video value greater than selected neighboring fastscan direction pixels; and,
identifying a set of fastscan minima extrema pixels having a video value less than selected neighboring fastscan direction pixels;

for each slowscan pixel column of said image:
identifying a set of slowscan maxima extrema pixels having a video value greater than selected neighboring slowscan direction pixels; and,
identifying a set of slowscan minima extrema pixels having a video value less than selected neighboring slowscan direction pixels;

for each pixel of said image:
  generating a fastscan maxima extrema frequency value $f_{Hx}$ based on a quantity of neighboring of fastscan maxima extrema pixels;
  generating a fastscan minima extrema frequency value $f_{Hn}$ based on a quantity of neighboring fastscan minima extrema pixels;
  generating a slowscan maxima extrema frequency value $f_{Vx}$ based on a quantity of neighboring slowscan maxima extrema pixels; and,
  generating a slowscan minima extrema frequency value $f_{VN}$ based on a quantity of neighboring slowscan minima extrema pixels;

for each pixel of said image:
  generating a halftone fastscan frequency estimate $f_H$ by selecting the greater between the fastscan maxima extrema frequency value $f_{Hx}$ at said each pixel and the fastscan minima extrema frequency value $f_{Hn}$ at said each pixel; and,
  generating a halftone slowscan frequency estimate $f_V$ by selecting the lesser between the slowscan maxima extrema frequency value $f_{Vx}$ at said each pixel and the slowscan minima extrema frequency value $f_{Vn}$ at said each pixel; and, for each pixel, determining a halftone line frequency estimate f based on a norm of said halftone fastscan frequency estimate $f_H$ and said halftone slowscan frequency estimate $f_V$.

2. The method of determining a halftone line frequency estimate f according to claim 1 wherein:
  the step of identifying the set of fastscan maxima extrema pixels includes identifying said set of fastscan maxima pixels having a video value greater than at least four neighboring fastscan direction pixels;
  the step of identifying said set of fastscan minima extrema pixels includes identifying said set of fastscan minima extrema pixels having a video value less than at least four selected neighboring fastscan direction pixels;
  the step of identifying said set of slowscan maxima extrema pixels includes identifying said set of slowscan maxima extrema pixels having a video value greater than at least four selected neighboring slowscan direction pixels; and,
  the step of identifying said set of slowscan minima extrema pixels includes the step of identifying said set of slowscan minima extrema pixels having a video value less than at least four selected neighboring slowscan direction pixels.

3. The method of determining a halftone line frequency estimate f according to claim 2 wherein:
  the step of determining said set of fastscan maxima extrema pixels includes the step of, for each pixel V(i) of said each fastscan pixel row of said image, determining whether said each pixel is a one of said set of fastscan maxima extrema pixels according to:

```
M[1]=0;
if(    V[i] > V[i-1] &&
       V[i] >= V[i+1]){
    if(    (V[i] - V[i-1]> T_noise||
           V[i] - V[i-2]> T_noise) &&
           (V[i] - (V[i+1]>>1) - (V[i+2]>>1)>0||
           V[i] - V[i+1]> T_noise)){
        M[i]=1;
    }
    if(    (V[i] - V[i+1]> T_noise||
           V[i] - V[i+2]>T_noise&&
           (V[i-2] - (V[i-1]>>1) - (V[i]>>1) <=0 &&
           V[i-2] - V[i-1] <= T_noise)){
        M[i]=1;
    }
}
;
``` the step of determining said set of fastscan minima extrema pixels includes the step of, for each pixel V(i) of said each fastscan pixel will of said image, determining whether said each pixel is a one of said set of fastscan minima extrema pixels according to:

```
M[1]=0;
if(    V[i] < V[i-1] &&
       V[i] <= V[i+1]){
    if(    (V[i] - V[i-1] < T_noise||
           V[i] - V[i-2] < T_noise) &&
           (V[i] - (V[i+1]<<1) - (V[i+2]<<1)<0||
           V[i] - V[i+1] < T_noise)){
        M[i]=1;
    }
    if(    (V[i] - V[i+1] < T_noise||
           V[i] - V[i+2] < T_noise&&
           (V[i-2] - (V[i-1]<<1) - (V[i]<<1) <=0 &&
           V[i-2]-V[i-1]<=T_noise)){
        M[i]=1;
    }
}
;
``` the step of determining said set of slowscan maxima extrema pixels includes the step of, for each pixel V(i) of said each slowscan pixel row of said image, determining whether said each pixel is a one of said set of slowscan maxima extrema pixels according to:

```
M[1]=0;
if(    V[i] > V[i-1] &&
       V[i] >= V[i+1]){
    if(    (V[i] - V[i1] > T_noise||
           V[i] - V[i-2] > T_noise) &&
           (V[i]- (V[i+1]>>1)-(V[i+2]>>1)>0||
           V[i] - V[i+1] > T_noise)){
        M[i]=1;
    }
    if(    (V[i] - V[i+1] > T_noise||
           V[i] - V[i+2] > T_noise&&
           (V[i-2] - V[i-1]>>1) - (V[i]>>1) <=0 &&
           V[i-2] - V[i-1] <= T_noise)){
        M[i]=1;
    }
}
;
``` the step of determining said set of slowscan minima extrema pixels includes the step of, for each pixel V(i) of said each slowscan pixel column of said image, determining whether said each pixel is a one of said set of slowscan minima extrema pixels according to:

```
M[1]=0;
if(     V[i] < V[i-1] &&
        V[i] <= V[i+1]){
    if(     (V[i] - V[i-1] < T_noise||
            V[i] - V[i-2] > T_noise) &&
            (V[i] - (V[i+1]<<1) - (V[i+2]<<1)<0||
            V[i] - V[i+1] < T_noise)){
        M[i]=1;
    }
    if(     (V[i] - V[i+1] < T_noise||
            V[i] - V[i+2] < T_noise&&
            (V[i-2] - (V[i-1]<<1) - (V[i]<<1) <=0 &&
            V[i-2] - V[i-1] <= T_noise)){
        M[i]=1;
    }
}
``` where V(i−1) is a video value of a pixel spaced one pixel away on a first side of said each pixel V(i);

V(i−1) is a video value of a pixel spaced two pixels away on the first side of said each pixel V(i);

V(i+1) is a video value of a pixel spaced one pixel away on a second side of said each pixel V(i);

V(i+2) is a video value of a pixel spaced two pixels away on the second side of said each pixel V(i); and, $T_{noise}$ is a preselected noise value parameter.

4. A method of estimating a halftone line screen frequency f at a pixel of interest in an image formed of a plurality of pixels having video values, the method comprising the steps of:

determining a first single dimensional frequency estimate $f_H$ based on video values of a first set of pixels forming a row of pixels in said image including said pixel of interest;

determining a second single dimensional frequency estimate $f_V$ based on video values of a second set of pixels forming a column of pixels in said image including said pixel of interest; and, calculating said halftone line screen frequency estimate f at said pixel of interest based on a norm of said first single dimensional frequency estimate $f_H$ and said second single dimensional frequency estimate $f_V$.

5. The method according to claim 4 wherein:

the step of determining said first single dimensional frequency estimate $f_H$ includes determining a first maxima extrema frequency estimate $f_{HX}$ and a first minima extrema frequency estimate $f_{HN}$ based on peak video values among said first set of pixels in said row of pixels; and, the step of determining said second single dimensional frequency estimate $f_V$ includes determining a second maxima extrema frequency estimate $f_{VX}$ and a second minima extrema frequency estimate $f_{VN}$ based on peak video values among said second set of pixels in said column of pixels.

6. The method according to claim 5 wherein:

the step of determining said first single dimensional frequency estimate $f_H$ includes selecting the greater of said first maxima extrema frequency estimate $f_{HX}$ and said first minima extrema frequency estimate $f_{HN}$ as said first single dimensional frequency estimate $f_H$ according to $f_H=\max(f_{HX}, f_{HN})$; and, the step of determining said second single dimensional frequency estimate $f_V$ includes selecting the greater of said second maxima extrema frequency estimate $f_{VX}$ and said second minima extrema frequency estimate $f_{VN}$ as said second single dimensional frequency estimate $f_V$ according to $f_V=\max(f_{VX}, f_{VN})$.

7. The method according to claim 6 wherein the step of calculating said halftone line screen frequency estimate f includes calculating said halftone line screen frequency estimate f at said pixel of interest based on said norm of said first single dimensional frequency estimate $f_H$ and said second single dimensional frequency estimate $f_V$ according to $f=\sqrt{f_H^2+f_V^2}$.

8. The method according to claim 6 further including the step of determining a halftone line screen angle estimate α at said pixel of interest based on a ratio between said first single dimensional frequency estimate $f_H$ and said second single dimensional frequency estimate $f_V$.

9. The method according to claim 8 wherein the step of determining said halftone line screen angle estimate α at includes calculating said halftone line screen angle estimate at based on said ratio between first single dimensional frequency estimate $f_H$ and said second single dimensional frequency estimate $f_V$ according to $α=\arctan(f_V/f_H)$.

10. The method according to claim 5 wherein:

the step of determining said first maxima extrema frequency estimate includes determining said first maxima extrema frequency estimate based on a video value of said pixel of interest relative to said video values of said first set of pixels forming said row of pixels in said image and relative to a predetermined noise value to prevent false video peak detection due to noise in said image;

determining said first minima extrema frequency estimate includes determining said first minima extrema frequency estimate based on said video value of said pixel of interest relative to said video values of said first set of pixels forming said row of pixels in said image and relative to said predetermined noise value to prevent false video peak detection due to noise in said image;

the step of determining said second maxima extrema frequency estimate includes determining said second maxima extrema frequency estimate based on said video value of said pixel of interest relative to said video values of said second set of pixels forming said column of pixels in said image and relative to said predetermined noise value to prevent false video peak detection due to noise in said image; and, the step of determining said second minima extrema frequency estimate includes determining said second minima extrema frequency estimate based on said video value of said pixel of interest relative to said video values of said second set of pixels forming said column of pixels in said image and relative to said predetermined noise value to prevent false video peak detection due to noise in said image.

11. The method according to claim 5 wherein:

the step of determining said first single dimensional frequency estimate includes calculating said first single dimensional frequency estimate to prevent false shallow peak detection due to a first peak video value proximate a second substantially larger peak video value in said image and, the step of determining said second single dimensional frequency estimate includes calculating said second single dimensional frequency estimate to prevent said false shallow peak detection due to a third peak video value proximate a fourth substantially larger peak video value in said image.

12. The method according to claim 5 wherein:

the step of determining said first single dimensional frequency estimate includes calculating said first single dimensional frequency estimate to prevent false flat peak detection due to a first peak video value proximate one or more second substantially similar peak video values in said image; and, the step of determining said second single dimensional frequency estimate includes calculating said second single dimensional frequency estimate to prevent said false flat peak detection due to a third peak video value proximate one or more fourth substantially similar peak video values in said image.

13. The method according to claim 4 further including determining a halftone line frequency estimate $f_{V(i)}$ for each pixel the V(i) in said image.

14. The method according to claim 13 wherein the step of determining said halftone line frequency estimate $f_{V(i)}$ includes the steps of, for each pixel V(i):

determining an estimated first single dimensional frequency estimate $f_{H_{V(i)}}$ based on a video value of a first set of pixels $v(i-1)_H \ldots v(i+2)_H$.

15. An apparatus for estimating a halftone line screen frequency f at a pixel of interest in an image formed of a plurality of pixels having video values, the apparatus comprising:

a fastscan frequency estimator circuit for determining a first single frequency estimate $f_H$ based on video values of a first set of pixels forming a row of pixels in said image including said pixel of interest;

a slowscan frequency estimator circuit for determining a second single dimensional frequency estimate $f_V$ based on video values of a second set of pixels forming a column of pixels in said image including said pixel of interest; and, a halftone line frequency estimator circuit for calculating said halftone line screen frequency estimate f at said pixel of interest based on a norm of said first single dimensional frequency estimate $f_H$ and said second single dimensional frequency estimate $f_V$.

16. The apparatus according to claim 15 further including:

a first fastscan localized frequency estimator circuit for determining a first maxima extrema frequency estimate $f_{HX}$ based on peak video values among said first set of pixels in said row of pixels;

a second fastscan localized frequency estimator circuit for determining a first minima extrema frequency estimate $f_{HN}$ based on peak video values among said first set of pixels in said row of pixels;

a first slowscan localized frequency estimator circuit for determining a second maxima extrema frequency estimate $f_{VX}$ based on peak video values among said second set of pixels in said column of pixels, and a second slowscan localized frequency estimator circuit for determining a second minima extrema frequency estimate $f_{VN}$ based on peak video values among said second set of pixels in said column of pixels.

17. The apparatus according to claim 16 wherein:

said first fastscan localized frequency estimator circuit includes means for determining said first maxima extrema frequency estimate based on a video value of said pixel of interest relative to said video values of said first set of pixels forming said row of pixels in said image and relative to a predetermined noise value to prevent false video peak detection due to noise in said image;

said second fastscan localized frequency estimator circuit includes means for determining said first minima extrema frequency estimate based on said video value of said pixel of interest relative to said video values of said first set of pixels forming said row of pixels in said image and relative to said predetermined noise value to prevent false video peak detection due to noise in said image;

said first slowscan localized frequency estimator circuit includes means for determining said second maxima extrema frequency estimate based on said video value of said pixel of interest relative to said video values of said second set of pixels forming said column of pixels in said image and relative to said predetermined noise value to prevent false video peak detection due to noise in said image; and, said second slowscan localized frequency estimator circuit includes means for determining said second minima extrema frequency estimate based on said video value of said pixel of interest relative to said video value of said second set of pixels forming said column of pixels in said image and relative to said predetermined noise value to prevent false video peak detection due to noise in said image.

18. The apparatus according to claim 16 wherein:

said fastscan frequency estimator circuit includes means for calculating said first single dimensional frequency estimate to prevent false shallow peak detection due to a first peak video value proximate a second substantially larger peak video value in said image; and, said slowscan frequency estimator circuit includes means for calculating said second single dimensional frequency estimate to prevent said false shallow peak detection due to a third peak video value proximate a fourth substantially larger peak video value in said image.

19. The apparatus according to claim 16 wherein:

said fastscan frequency estimator circuit includes means for calculating said first single dimensional frequency estimate to prevent false flat peak detection due to a first peak video value proximate one or more second substantially similar peak video values in said image; and, said slowscan frequency estimator circuit includes means for calculating said second single dimensional frequency estimate to prevent said false flat peak detection due to a third peak video value proximate one or more fourth substantially similar peak video values in said image.

20. The apparatus according to claim 15 further including a halftone line angle estimator circuit for determining a halftone line screen angle estimate α at said pixel of interest based on a ratio between said first single dimensional frequency estimate $f_H$ and said single dimensional frequency estimate $f_V$.

* * * * *